United States Patent
Critelli et al.

(12) 
(10) Patent No.: US 6,718,649 B1
(45) Date of Patent: Apr. 13, 2004

(54) TAPE MEASURE HOUSING WITH POST

(75) Inventors: James M. Critelli, Fuquay-Varina, NC (US); William C. Blackman, Raleigh, NC (US)

(73) Assignee: Cooper Brands, Inc., Houston, TX (US)

( * ) Notice: Subject to any disclaimer, the term of this patent is extended or adjusted under 35 U.S.C. 154(b) by 0 days.

(21) Appl. No.: 10/347,665

(22) Filed: Jan. 21, 2003

(51) Int. Cl.⁷ .................................................. G01B 3/10
(52) U.S. Cl. ............................ 33/761; 33/769; 242/379
(58) Field of Search ........................... 33/758, 761, 768, 33/769, 770; 242/371, 376, 379, 570

(56) References Cited

U.S. PATENT DOCUMENTS

| | | | | |
|---|---|---|---|---|
| 3,216,117 A | * | 11/1965 | Stowell | 33/769 |
| 3,672,597 A | * | 6/1972 | Williamson | 242/379 |
| 3,812,588 A | | 5/1974 | Bennett | |
| 4,286,387 A | | 9/1981 | Di Diego | |
| 4,363,171 A | | 12/1982 | Scandella | |
| 4,662,078 A | * | 5/1987 | Gammon et al. | 33/768 |
| 4,986,487 A | | 1/1991 | Irvin | |
| 5,416,978 A | * | 5/1995 | Kaufman | 33/770 |
| 6,131,844 A | * | 10/2000 | Hsu | 33/761 |
| 6,243,964 B1 | | 6/2001 | Murray | |
| 6,276,071 B1 | * | 8/2001 | Khachatoorian | 33/767 |
| 6,318,664 B1 | * | 11/2001 | Sumiyashiki | 242/379 |
| 6,324,769 B1 | | 12/2001 | Murray | |
| 6,405,451 B1 | * | 6/2002 | Hsu | 33/761 |
| 6,449,866 B1 | | 9/2002 | Murray | |
| 6,477,785 B1 | * | 11/2002 | Hsu | 33/761 |
| 6,612,046 B1 | * | 9/2003 | Cimorell et al. | 33/770 |

* cited by examiner

*Primary Examiner*—G. Bradley Bennett
(74) *Attorney, Agent, or Firm*—Coats & Bennett, PLLC (57) ABSTRACT

A tape measure housing has first and second sidewalls and a peripheral wall. A metal post is extends between the first and second sidewalls and includes an elongate column portion disposed along an axis and a base portion. The base portion includes a plurality of ribs extending generally normal to the axis. The column portion includes a slot. A fastener may extend through the first sidewall and mate to the column portion. The second sidewall includes a boss having a recess configured to accept the ribs such that the material forming the boss interstitially interengages with the ribs. A fastener may extend through the second sidewall and mate to the base portion. The anchoring portion of the post may include a non-circular flange extending generally normal to the axis, with the recess being configured to accept the flange.

22 Claims, 6 Drawing Sheets

TAPE MEASURE HOUSING WITH POST

FIELD OF THE INVENTION

The present invention is directed generally to tape measures, and more particularly to power return tape measures and/or housings therefor.

BACKGROUND OF THE INVENTION

Modern tape measures (or "tape rules") typically include a coiled tape that is spring-biased towards a retracted position. A housing generally surrounds and protects the tape and a retraction spring and includes an opening through which a distal end of the tape extends. Typically, the tape measure housing consists of two housing halves that are joined together by one or more screws. In addition, one of the housing halves typically includes an inwardly pointing integral post that provides an anchoring point for one end of the retraction spring. During assembly, the reel is placed over the post with the retraction spring engaged by the post, and the other housing half is then joined to the first housing half with blade winding reel captured therebetween. During use, the distal end of the tape is pulled away from the housing; when released, the spring pulls the tape back into the housing so that the tape returns to the retracted position. The retracted tape is typically wound on the reel that is in turn rotatably supported by the housing.

One important consideration when designing commercially available tape measures is that the tape measure should be able to function even after being repeatedly dropped, as frequently occurs on a construction site. Dropping the tape measure subjects the tape measure housing to substantial shock loadings that tend to distort the housing halves. When the housing halves are distorted, the internal post may become dislodged from its desired position, leading to uneven loading on the post, and ultimately failure. Indeed, it is believed that one of the major causes of tape measure failure is breakage of the post, which un-anchors the retraction spring inside the housing, thereby damaging the return mechanism, and possibly the entire inner chamber of the housing, typically rendering the tape measure unusable.

Another consideration in designing tape measure housings is the torsional loading placed on the post by the retraction spring. As tape blade lengths increase, more powerful springs are required, which leads to more torsional loading on the posts. Because the posts and housing halves are typically made from injection molded plastic materials, the material strength of the posts have not always been capable of withstanding these increased torsional loadings on the post.

Accordingly, there remains a need for improved tape measure housing designs, particularly those that have a more robust post design, an preferably designs that address one or more of the problems outlined above.

SUMMARY OF THE INVENTION

The present invention is directed to a tape measure housing, a tape measure incorporating the housing, and/or a method of assembling a tape measure, each of which use a post joined to at least one sidewall of the housing.

In one embodiment, the tape measure housing comprises a main case having first and second sidewalls and a peripheral wall extending between the sidewalls. A post is disposed between the first and second sidewalls. The post has an elongate column portion disposed along an axis and a base portion. The base portion includes a plurality of ribs extending generally normal to the axis. The column portion includes a slot and optionally a terminal hole. The second sidewall may include a boss having a recess configured to accept at least the ribs of the post. Ideally, the material forming the boss interstitially interengages with the ribs of the post. The anchoring portion of the post may optionally include a flange extending generally normal to the axis, with the flange having a non-circular shape and the recess configured to accept the flange. The first sidewall may include another boss having a recess configured to accept a terminal portion of the column portion of the post. The post may be made from metal. Preferably, a fastener (e.g., screw) extends through the first sidewall and mates to the terminal hole of the post. More preferably, another fastener also extends through the second sidewall and mates to the base portion of the post.

In another embodiment, a method of assembling a tape measure includes providing a main case having first and second sidewalls and a peripheral wall extending between the sidewalls; disposing a post between the first and second sidewalls, the post having an elongate column portion disposed along an axis and a base portion, the base portion including a plurality of ribs extending generally normal to the axis, the column portion including a slot and optionally having a terminal hole; rotatably supporting a reel within the main case; providing a tape blade convolutionally wound on the reel; optionally mating a fastener to the post through the first sidewall; optionally mating another fastener to the post through the second sidewall; and operatively connecting a spring to the slot and to the tape blade, the spring biasing the tape blade for retraction into the main case. Providing the main case having first and second sidewalls and the peripheral wall extending between the sidewalls may comprise providing distinct first and second case portions, wherein the first case portion includes the first sidewall and the second case portion includes the second sidewall.

In still another embodiment, a tape measure may use the tape measure housing and/or method of assembly described above.

DETAILED DESCRIPTION OF THE INVENTION

Figure 1:
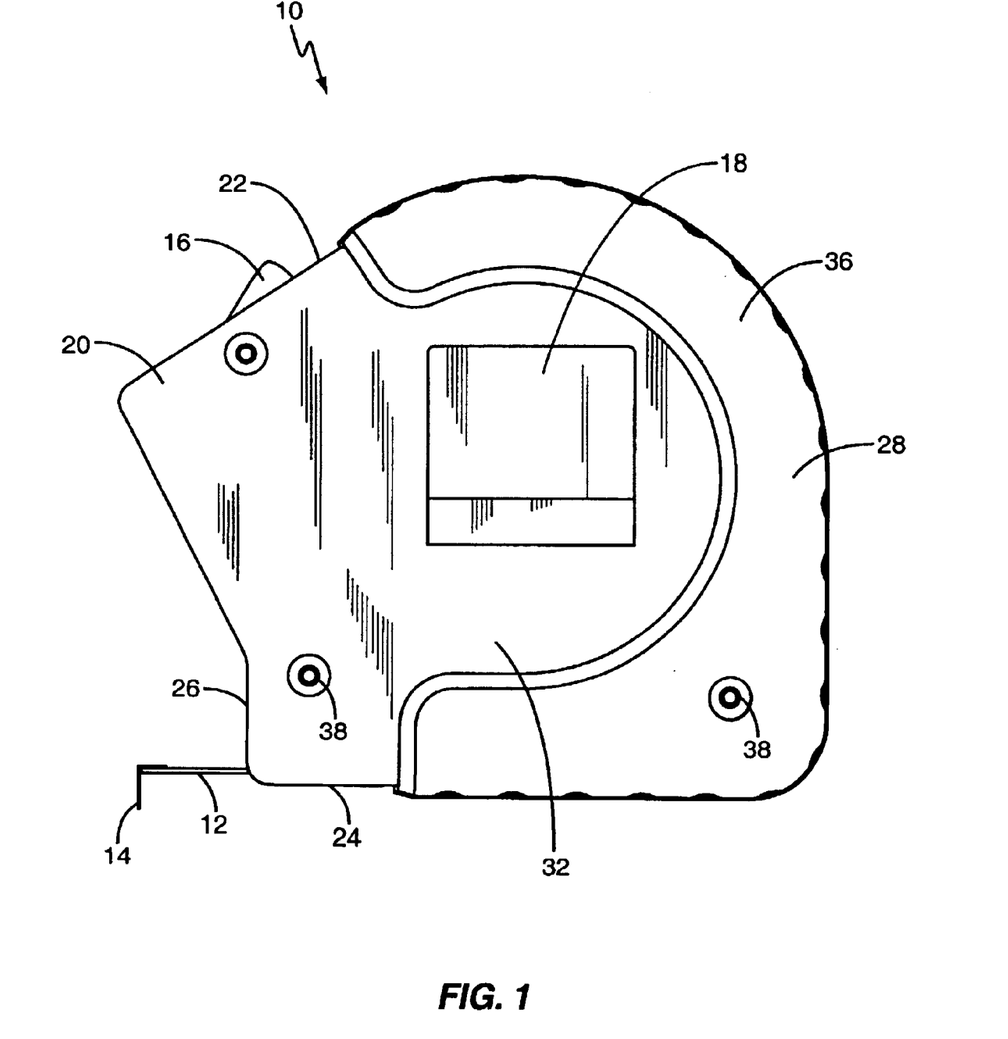
FIG. 1 is a side view of one tape measure embodiment constructed in accordance with the present invention.

As illustrated in FIG. 1, a tape measure, generally designated 10, is shown constructed according to the present invention. The tape measure 10 includes a coilable measuring tape or blade 12 and an associated housing 20. The distal end of the tape 12 may advantageously include an end hook 14 to prevent it from being retracted into the housing 20. A tape-biasing device, such as a retraction spring, is operatively connected to the tape 12 to bias it towards a retracted orientation. A locking mechanism, including a toggle 16 or similar actuator is provided to aid in controlling the movement of the tape 12 into and out of the housing 20. One or both sides of the housing 20 may include a clip 18, as desired. As the general design and operation of power return tape measures are well known in the art, additional detailed discussion of the components other than the housing are omitted herein for brevity. However, additional discussion may be found in U.S. Pat. Nos. 4,527,334; 4,976,048; and 6,349,482, which are incorporated herein by reference.

Figure 2:
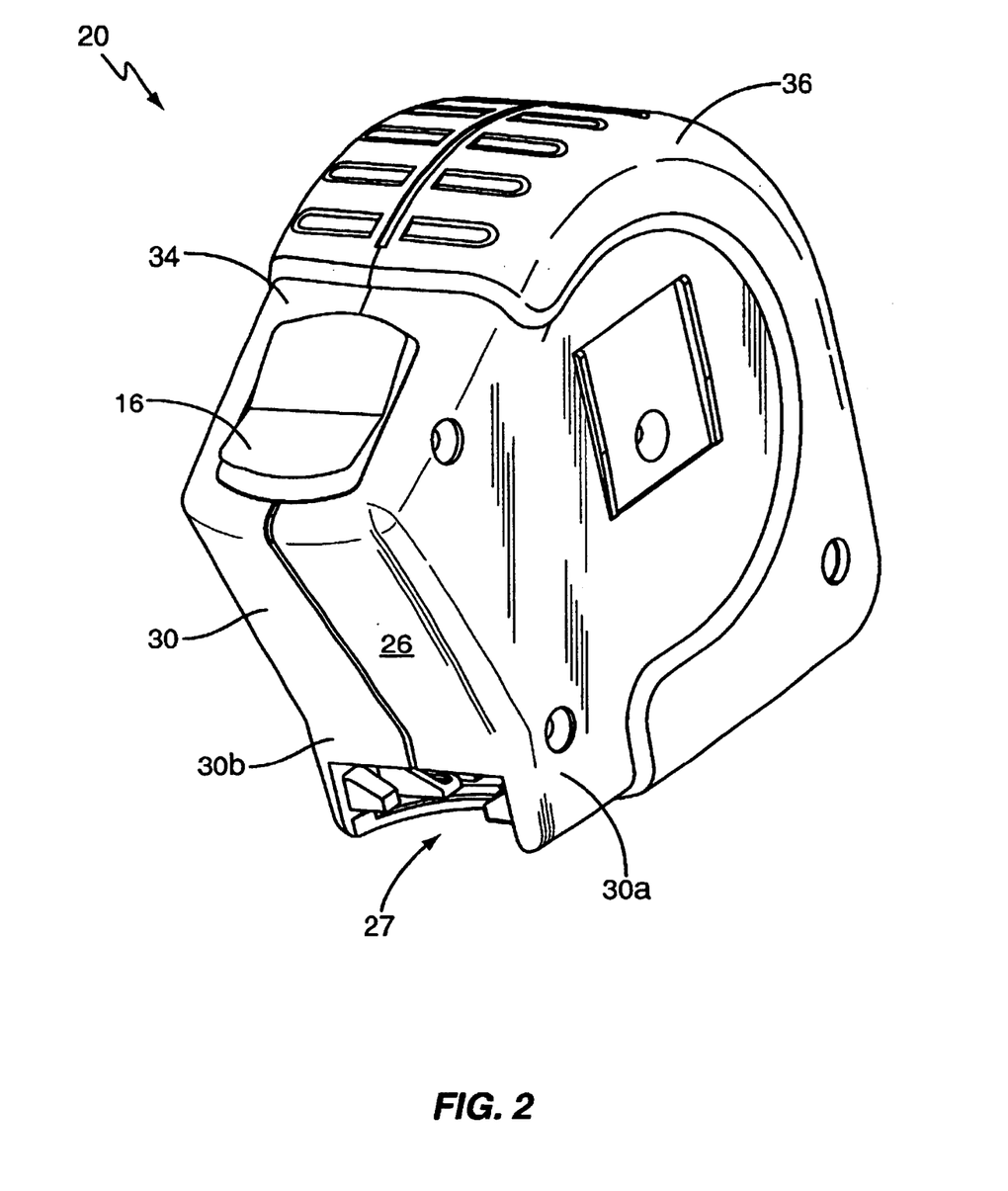
FIG. 2 is a perspective view of one embodiment of a tape measure housing in accordance with the present invention with some elements removed for clarity (e.g., screws, clip, etc.).

The housing 20 typically includes a main case or shell 30 and a grip element 36 mounted on the shell 30. The housing 20 preferably has a generally squarish shape, with a rounded upper-rear corner and may have a slightly projecting nose, as shown in FIGS. 1–2. The housing 20 includes an opposing pair of sidewalls 32 and an interconnecting peripheral wall 34 that help define an internal chamber 29 (see FIG. 5) that houses the coiled portion of the tape 12, a suitable tape-biasing device, and portions of the locking mechanism. As shown in the Figures, the peripheral wall 34, and thus the shell 30, may be thought of as having a top 22, a bottom 24, a front 26, and a rear 28. The housing 20 typically includes an opening 27 near its lower front corner that connects to the internal chamber 29. The distal end of the tape 12 extends through this opening 27. The housing 20 is preferably sized to fit within a user's hand, and also conveniently stored on a work belt or in a toolbox.

As shown in FIG. 2, the shell 30 may be constructed from two portions, a right-hand portion 30a and a left-hand portion 30b, joined together by suitable screws 38, as is known in the art. The external configurations of both the shell portions 30a,30b and the grip element portions 36 may advantageously be symmetrical if desired, but this is not required. Indeed, the two portions 30a,30b may have different internal and external configurations, depending on the internal workings of the tape measure 10, also as is known in the art. However, as the present invention primarily relates to the internal configuration of the housing 20, the details of the external configuration of the shell 30 are not important to understanding the present invention, and the following discussion will focus on the internal structure of the housing 20. More information on possible external configurations of the housing 20 may be found in U.S. patent application Ser. No. 10/174,629, which is incorporated herein by reference.

Figure 3:
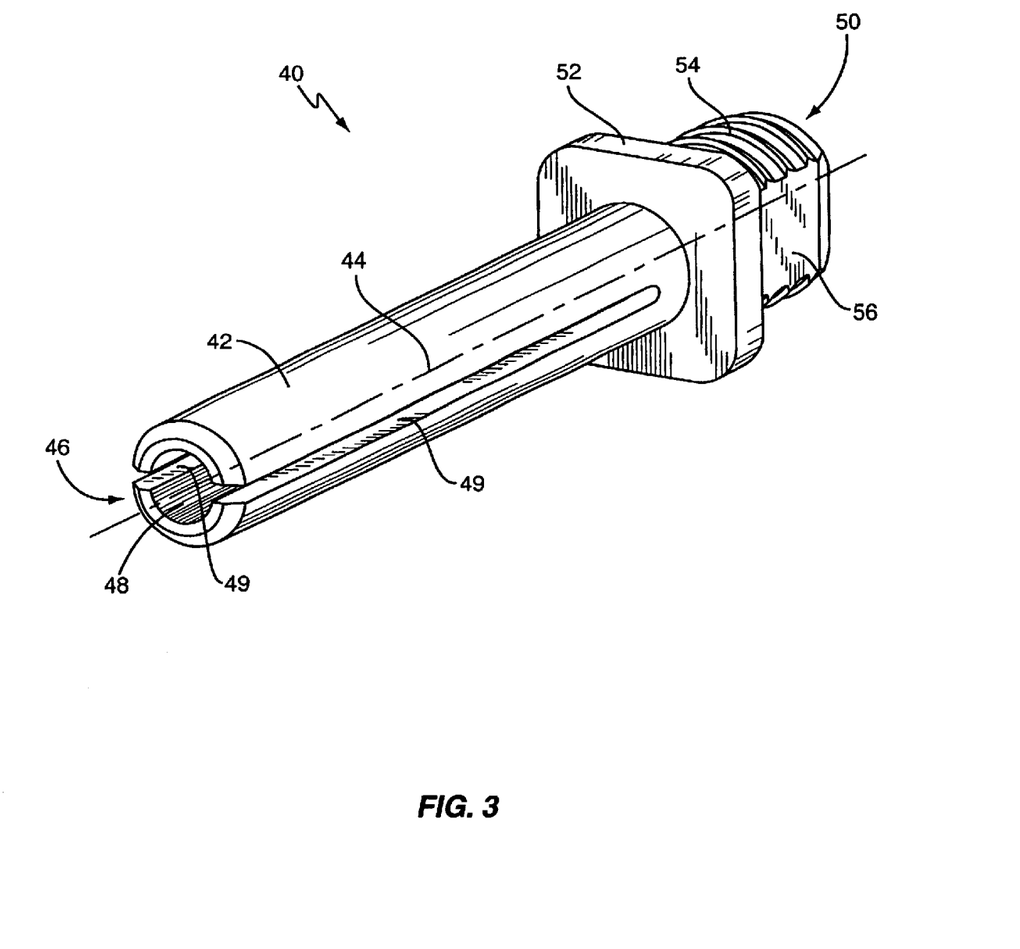
FIG. 3 is a perspective view of one embodiment of a post suitable for the present invention.
Figure 4:
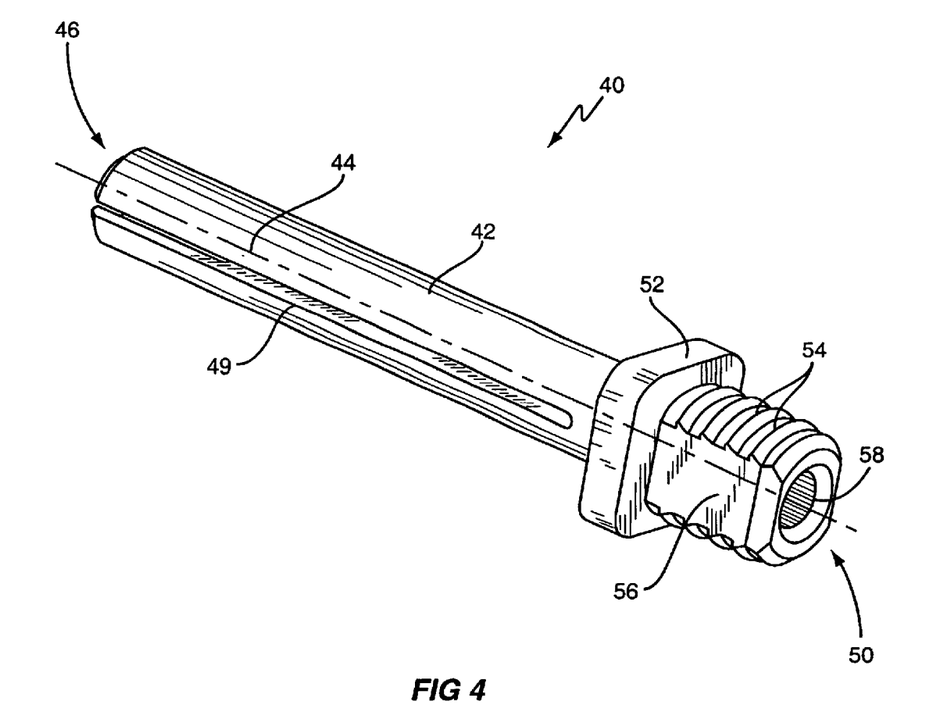
FIG. 4 is another perspective view of the post of FIG. 3.

A post 40 is disposed between the respective sidewalls, internal to the housing. The post 40, shown in FIGS. 3–5, includes an column portion 42 and an anchoring (or base) portion 50. The column portion 42 is generally elongate along axis 44, and may advantageously have a generally circular cross-section split by slot 49. The slot 49 extends from the terminal end 46 of post 40 toward the anchoring portion 50. The terminal end 46 of post 40 may advantageously include a hole 48 that is intended to accept a fastener 60, as described further below, and may include a chamfer if desired. The anchoring portion 50 of the post 40 includes a flange 52 and a plurality of ribs 54. The flange 52 is disposed proximate the column portion 42, and advantageously has a non-circular shape. The ribs 54 extend radially outward from the axis 44, and may therefore be considered as extending generally normal to the axis 44. There are preferably four ribs 54, but other numbers of ribs 54 may also be used. The ribs 54 have a profile that is generally flat on the side toward the flange 52, and slopes backward at an angle on the side away from the flange 52, such as at an angle of 15° to 45°, a preferably approximately 30°. The ribs 54 may be of suitable size, such as approximately 0.006 to 0.010 inches in height. The portion of anchoring portion 50 having the ribs 54 thereon may be round, or may advantageously be non-circular with appropriate flats 56 or the like. Thus, the ribs 54 may extend circumferentially entirely around the post 40, or may be interrupted by the flats 56, as shown in FIGS. 3–4. The end of the anchoring portion 50 opposite the column portion 42 may also advantageously include a hole 58, similar to hole 48 in size and function.

Figure 5:
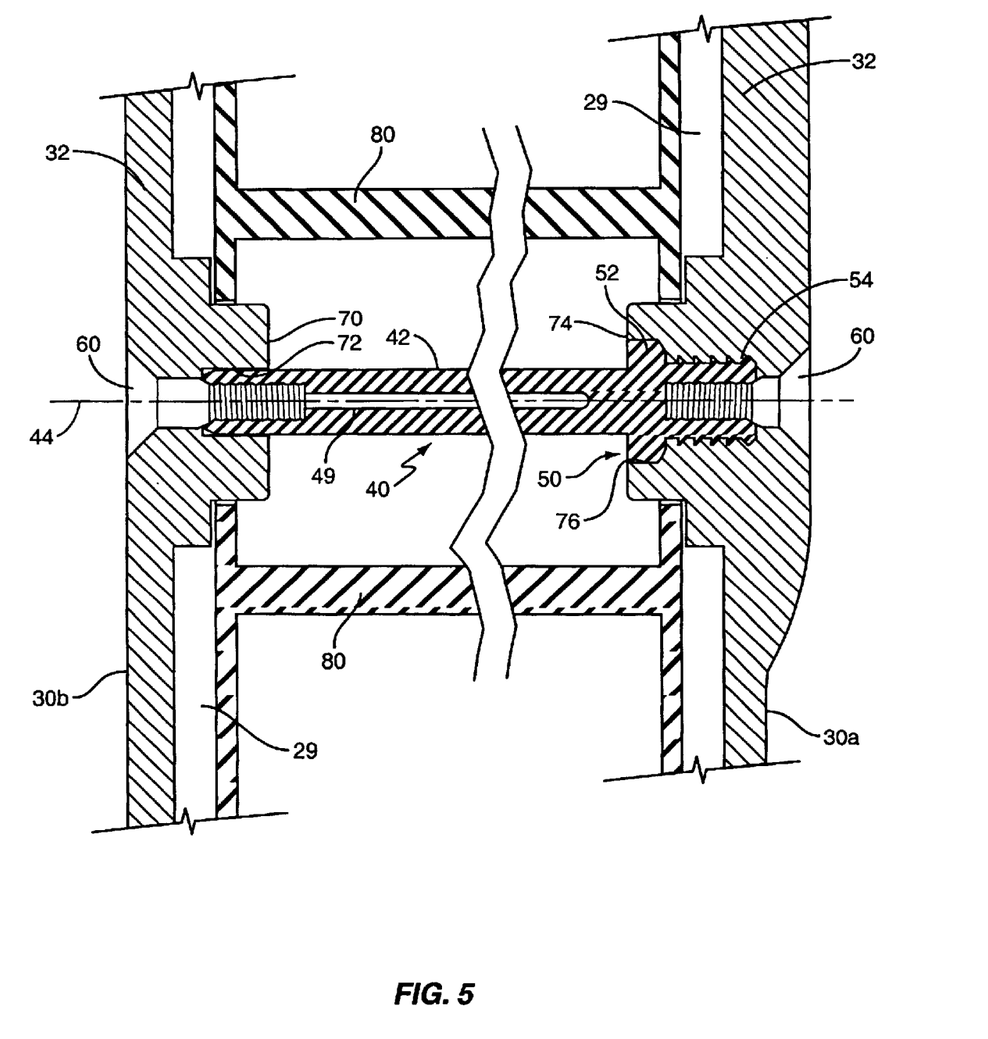
FIG. 5 shows the respective ends of the post of FIG. 3 secured in the tape measure housing.

The post 40 advantageously mates to the sidewalls 32 of the housing shell 30 using corresponding bosses 70,74 in the sidewalls 32. One sidewall, such as the sidewall 32 of the left half 30b of shell 30, may include boss 70 which is substantially round in shape with a recess 72 intended to accept the terminal end 46 of post 40. The other sidewall, such as the sidewall 32 of the right half 30a of shell 30, may include a boss 74 with a more complex recess 76 with an upper portion corresponding in shape to the flange 52, and a lower portion corresponding in shape to the ribbed area of the anchoring portion 50 of post 40. Recess 76 may be round in shape if desired, and should be sized so that there is a sliding fit between the wall defining the recess 76 and the anchoring portion 50 at a point between the ribs 54. At least recess 72, and preferably both recesses 72,76, should include suitable through holes for allowing access to holes 48,58 in post 40 for securing fasteners 60 thereto.

Figure 6:
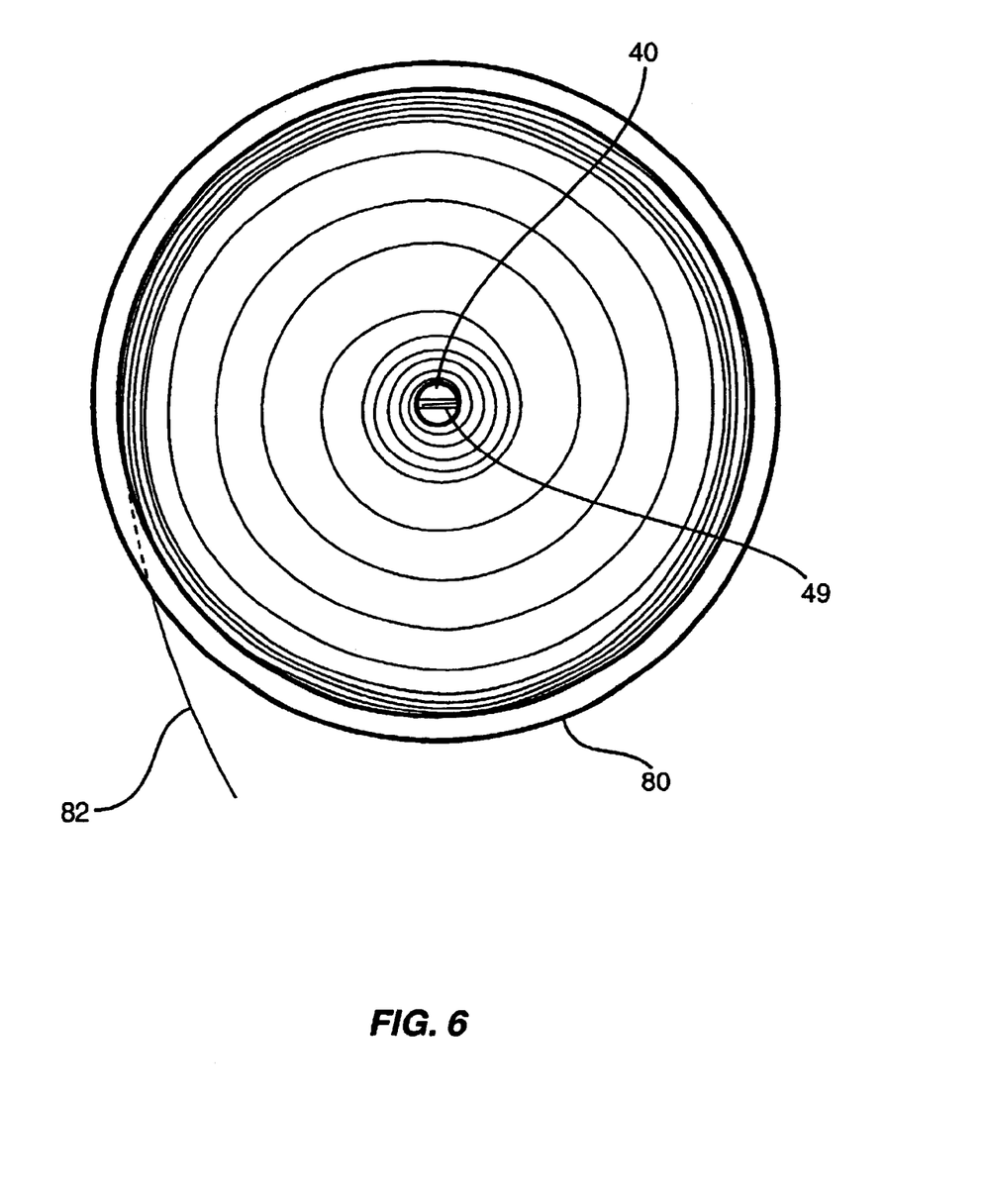
FIG. 6 shows a simplified side view of the retraction spring, post, and reel.

The tape measure 10 may be assembled using mostly conventional techniques, with some modifications to take advantage of the novel aspects of the post 40. The assembly process begins with the anchoring portion 50 of post 40 being mated to the half 30a of shell 30 that includes boss 74. The end of the post 40 corresponding to the anchoring portion 50 is inserted into the recess 76 such that the ribs 54 bite into the boss 74. This mating of the post 40 with shell half 30a may be accomplished using an arbor press if desired. With the post 40 mated to the shell half 30a, the reel 80 and spring 82 (sometimes collectively referred to as the drum shell assembly) are mounted to shell half 30a, with one end of spring 82 being inserted into slot 49 (see FIG. 6). It should be noted that the reel (or drum) 80 is intended to be rotatably supported by the bosses 70,74 of the housing 20 when fully assembled. The reel 80 is then temporarily clamped to the shell half 30a and the "free end" is then rotated about the reel 80 so that a preload is placed on the spring 82, typically using a powered winding tool/fixture. The free end of the spring 82 is routed out of the shell half 30a, a optional cover (not shown) is added to cover the center axial open area of the drum 80, and the tape blade 12 (with hook 14 attached) is then connected to the free end of the spring, and the spring is released so that the blade 12 is wound onto the reel 80. The locking mechanism (e.g., toggle 16, etc.) and other relevant internal components are then added along with the other half of the shell 30b. Screws 38 are added to hold the housing halves 30a,30b together. The post mounting screws 60, if used, are inserted through the corresponding sidewalls 32 and screwed into their respective holes 48,58, thereby very firmly mounting the post 40 to the shell 30. The holes 48,58 may be threaded, or alternatively the post mounting screws 60 may be self-tapping. If desired, one of the post mounting screws 60 may be used to attach the belt clip 18. From this point, the assembly of the tape measure 10 continues in a conventional fashion, e.g., labels are added, testing, etc.

It is believed that the material of boss 74 forming recess 76 will interstitially interengage the ribs 54, particularly over time. That is, the material of boss 74 forming recess 76 between the ribs 54 will arrange itself so that it extends inwardly towards the axis 44 as viewed from the tips of the ribs 54, thus the material would be "interstitial" with respect to the ribs 54. This interstitial interengaging allows the relevant sidewall 32 to very firmly grip the anchoring portion 50 of the post 40. It is believed that this gripping starts to occur immediately upon insertion of the anchoring portion 50, but increases over time through a process referred to as "cold flow." Thus, it is believed that the post is initially held in place by the frictional grip force of the ribs and the antirotational action of the flats 56 and/or the flange 52, with the grip force increasing over time. The advantageous addition of one or more post mounting screws 60 adds to this robust feature of the assembly.

The post 40 of the present invention thus performs two functions in the preferred embodiments. First, the post 40 acts to anchor one end of the retraction spring 82 by resisting torsional loading through the use of the non-circular flange and/or the flats 56. This anti-rotation function is supplemented by the action of the optional post mounting screws 60 in preferred embodiments. Second, the post 40 acts to reinforce the sidewalls 32 of the housing 20, preventing their distortion such as during impact drop loading. With both ends of the post 40 secured to the sidewalls 32 of the housing 20 via the combined action of the ribs 54, holes 48,58, the bosses 70,74, recesses 72,76, and post mounting screws 60, the likelihood that the post 40 will become disoriented in the housing 20 are greatly reduced, thereby providing a more robust tape measure housing design. The robustness is further enhanced when post 40 is made from metal rather than plastic.

Shell 30 is preferably made from a durable material such as a hardened plastic (e.g., ABS, polycarbonate, or the like). The post 40 is distinct from the shell 30, may be made from a different material. Preferably, post 40 is constructed from metal, such as steel or zinc alloys (e.g., a zinc-aluminum-magnesium-copper alloy known as zamak-5), using a die cast process. Using a metallic post 40 allows the post 40 to be of a smaller radial size while still retaining the requisite strength.

It should be understood that the tape measures 10 of the present invention may also include other features, such as shock-absorbing bumpers proximate the opening 27, specially coated blades 12, reinforcing hooks 14, various locking mechanisms, and like, all of which are known in the art.

While preferred embodiments of the present invention use post mounting screws 60 on both ends of the post 40, some less preferred embodiments use only one post mounting screw 60 at the terminal end 46 of post 40, and rely on the gripping of the ribs 54 and the action of the flats 56 to secure the anchoring portion 50 of the post 40. Other less preferred embodiments may use only one post mounting screw 60 at the anchoring portions 50 of post 40, and rely on interaction of the terminal end 46 of post and recess 72 to limit relative movement of the other end of post 40. In even less preferred embodiments, no post mounting screws 60 may be used, with the movement of post 40 relative to the shell 30 limited by the anchoring action of the ribs 54, flange 52, and flats 56 in recess 76 on one end, and the interaction of the terminal end 46 of post and recess 72 on the other end. The last described embodiment is believed to be significantly less robust than the preferred embodiments using at least two post mounting screws 60, and may also require some means to hold the clip 18 to the shell 30, such as a screw, adhesive, or snap-fit interlocking structures known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tape measure housing, comprising:
   a main case having first and second sidewalls and a peripheral wall extending between said sidewalls;
   a post disposed between said first and second sidewalls and having an elongate column portion disposed along an axis and a base portion;
   said base portion including a plurality of ribs extending generally normal to said axis;
   said column portion including a slot adapted to accept a spring; and
   at least a first fastener extending through said one of said first and second sidewalls and mated to said post.

2. The tape measure housing of claim 1 wherein said second sidewall includes a recess configured to accept at least said ribs of said post.

3. The tape measure housing of claim 2 wherein a material forming said recess interstitially interengages with said ribs of said post.

4. The tape measure housing of claim 2 wherein said base portion of said post further includes a flange extending generally normal to said axis, said flange having a non-circular shape; and wherein said recess is configured to accept said flange.

5. The tape measure housing of claim 2 wherein said second sidewall includes a boss that includes said recess, and further including a reel rotatably supported by said boss.

6. The tape measure housing of claim 1 wherein said base portion of said post further includes a flange extending generally normal to said axis, said flange having a non-circular shape.

7. The tape measure housing of claim 1 wherein said post is made from metal.

8. The tape measure housing of claim 1 said first fastener is a screw.

9. The tape measure housing of claim 1 wherein said column portion of said post has a circular cross-section.

10. The tape measure of claim 1 further including at least a second fastener extending through the other of said first and second sidewalls and mated to said post.

11. The tape measure housing of claim 1:
    wherein said base portion of said post further includes a flange extending generally normal to said axis, said flange having a non-circular shape;
    wherein said first sidewall includes a first boss having a recess configured to accept a terminal portion of said column portion of said post;
    wherein said second sidewall includes a second boss having a recess configured to accept said flange and said ribs of said post;
    wherein a material forming said second boss interstitially interengages with said ribs of said post;
    wherein said post is made from metal; and
    further including a reel rotatably supported by said first and second bosses.

12. A tape measure, comprising:
    a main case having first and second sidewalls and a peripheral wall extending between said sidewalls;
    a post disposed between said first and second sidewalls and having an elongate column portion disposed along an axis and a base portion;

said base portion including a plurality of ribs extending generally normal to said axis;

said column portion including a slot;

at least a first fastener extending through one of said first and second sidewalls and mated to said post;

a reel rotatably supported within said main case; and a spring operatively connected to said slot and to a tape blade, said spring biasing said tape blade for retraction into said main case.

13. The tape measure of claim 12 wherein said second sidewall includes a recess configured to accept at least said ribs of said post.

14. The tape measure of claim 13 wherein a material forming said recess interstitially interengages with said ribs of said post.

15. The tape measure of claim 13 wherein said base portion of said post further includes a flange extending generally normal to said axis, said flange having a non-circular shape; and wherein said recess is configured to accept said flange.

16. The tape measure of claim 12 wherein said sidewalls and said peripheral wall provide an internal chamber therewithin, said peripheral wall having an opening communicating with said chamber for passage of said tape blade therethrough.

17. The tape measure of claim 12 further including at least a second fastener extending through the other of said first and second sidewalls and mated to said post.

18. The tape measure of claim 12:

wherein said base portion of said post further includes a flange extending generally normal to said axis, said flange having a non-circular shape;

wherein said first sidewall includes a first recess configured to accept a terminal portion of said column portion of said post;

wherein said second sidewall includes a second recess configured to accept said flange and said ribs of said post;

wherein a material forming said second recess interstitially interengages with said ribs of said post; and wherein said post is made from metal.

19. A method of assembling a tape measure, comprising:

providing a main case having first and second sidewalls and a peripheral wall extending between said sidewalls;

disposing a post between said first and second sidewalls, said post having an elongate column portion disposed along an axis and a base portion, said base portion including a plurality of ribs extending generally normal to said axis, said column portion including a slot;

rotatably supporting a reel within said main case;

providing a tape blade convolutionally wound on said reel;

mating at least a first fastener to said post through one of said first and second sidewalls;

operatively connecting a spring to said slot and to said tape blade, said spring biasing said tape blade for retraction into said main case.

20. The method of claim 19 wherein providing said main case having first and second sidewalls and said peripheral wall extending between said sidewalls comprises providing distinct first and second case portions, wherein said first case portion includes said first sidewall and said second case portion includes said second sidewall.

21. The method of claim 19 further including mating at least a second fastener to said post through the other of said first and second sidewalls.

22. A tape measure housing, comprising:

a main case having first and second sidewalls and a peripheral wall extending between said sidewalls;

a substantially metallic post disposed between said first and second sidewalls and having a base portion and an elongate column portion disposed along an axis, said base portion including a plurality of ribs extending generally normal to said axis, said column portion including a slot adapted to accept a spring;

wherein said base portion of said post includes a flange extending generally normal to said axis, said flange having a non-circular shape;

wherein said second sidewall includes a recess configured to accept at least said ribs and said flange of said post such that a material forming said recess interstitially interengages with said ribs;

a first fastener extending through said first sidewall and mated to said post; and a second fastener extending through said second sidewall and mated to said post.

* * * * *